(12) United States Patent
Cunetto et al.

(10) Patent No.: US 8,102,861 B2
(45) Date of Patent: Jan. 24, 2012

(54) DATA AND VOICE MESSAGING SYSTEM

(75) Inventors: Philip C. Cunetto, Austin, TX (US);
Thomas L. Adams, Austin, TX (US);
John Lemay, Austin, TX (US);
Chien-Chun Lu, Austin, TX (US);
Timothy P. Schroeder, Austin, TX (US);
Marco Schneider, Austin, TX (US);
Melody Ho, Austin, TX (US)

(73) Assignee: AT&T Intellectual Property, L.P., Atlanta, GA (US)

( * ) Notice: Subject to any disclaimer, the term of this patent is extended or adjusted under 35 U.S.C. 154(b) by 256 days.

(21) Appl. No.: 12/242,439

(22) Filed: Sep. 30, 2008

(65) Prior Publication Data

US 2009/0059784 A1 Mar. 5, 2009

Related U.S. Application Data

(62) Division of application No. 10/247,808, filed on Sep. 19, 2002, now Pat. No. 7,447,739.

(51) Int. Cl.
*H04L 12/28* (2006.01)
*H04L 12/56* (2006.01)

(52) U.S. Cl. .......... 370/400; 370/401; 370/410
(58) Field of Classification Search .......... 370/352, 370/401; 379/88.13, 88.14, 88.17, 88.22, 379/88.25, 201.12, 201.02, 201.052, 265.09; 705/14, 206, 224, 228
See application file for complete search history.

(56) References Cited

U.S. PATENT DOCUMENTS

| 5,867,494 A * | 2/1999 | Krishnaswamy et al. ..... 370/352 |
| 6,161,134 A * | 12/2000 | Wang et al. .................. 709/220 |
| 7,209,551 B1 * | 4/2007 | Schroeder et al. ......... 379/88.13 |

* cited by examiner

*Primary Examiner* — Kwang B Yao
*Assistant Examiner* — Adam Duda
(74) *Attorney, Agent, or Firm* — Toler Law Group, PC

(57) ABSTRACT

A data messaging system includes a first Internet Protocol (IP) switch that includes a processor. The data messaging system also includes a first gateserver coupled to the first IP switch and coupled to a second IP switch. The data messaging system includes a second gateserver that is coupled to the first IP switch and to the second IP switch. The data messaging system further includes a first gatekeeper coupled to the first IP switch. The first gatekeeper is adapted to detect a failure of the first gateserver and to route data to the second gateserver in response to detecting the failure.

19 Claims, 6 Drawing Sheets

DATA AND VOICE MESSAGING SYSTEM

CLAIM OF PRIORITY

This application is a divisional application of, and claims priority from, U.S. patent application Ser. No. 10/247,808, filed Sep. 19, 2002, the contents of which are hereby incorporated in their entirety.

FIELD OF THE DISCLOSURE

The present disclosure relates to data and voice messaging systems and methods of using such systems.

BACKGROUND

Many systems have been deployed to provide messaging for users. An example of such systems includes voice-based systems, such as conventional office voice-mail systems and systems for use with distributed computer networks, such as electronic mail systems. More recently, some integrated systems provide for reception and storage of both voice messages and electronic mail messages. However, such integrated systems are often difficult to expand and scale, difficult to maintain, and expensive to operate. In addition, to add new functionality with such integrated systems may require considerable time and expense for custom development.

Accordingly, there is a need for an improved messaging system and method of using such systems.

BRIEF DESCRIPTION OF THE DRAWINGS

The use of the same reference symbols in different drawings indicates similar or identical items.

DETAILED DESCRIPTION

In a particular embodiment, a data messaging system includes a first Internet Protocol (IP) switch that includes a processor. The data messaging system also includes a first gateserver coupled to the first IP switch and coupled to a second IP switch. The data messaging system includes a second gateserver that is coupled to the first IP switch and to the second IP switch. The data messaging system further includes a first gatekeeper coupled to the first IP switch. The first gatekeeper is adapted to detect a failure of the first gateserver and to route data to the second gateserver in response to detecting the failure.

In another embodiment, a computer-readable medium storing processor-executable instructions is disclosed. When executed by a processor, the processor-executable instructions cause the processor to: detect a failure of a first gateserver coupled to a first Internet Protocol (IP) switch. The first gateserver is also coupled to a second IP switch. The processor-executable instructions also cause the processor to route data to a second gateserver in response to detecting the failure. The second gateserver is coupled to the first IP switch and the second gateserver is also coupled to the second IP switch.

In another embodiment, a method of routing data includes detecting a failure of a first gateserver coupled to a first Internet Protocol (IP) switch, where the first gateserver also coupled to a second IP switch. The method also includes routing data to a second gateserver in response to detecting the failure, where the second gateserver is coupled to the first IP switch and the second gateserver is also coupled to the second IP switch.

Figure 1:
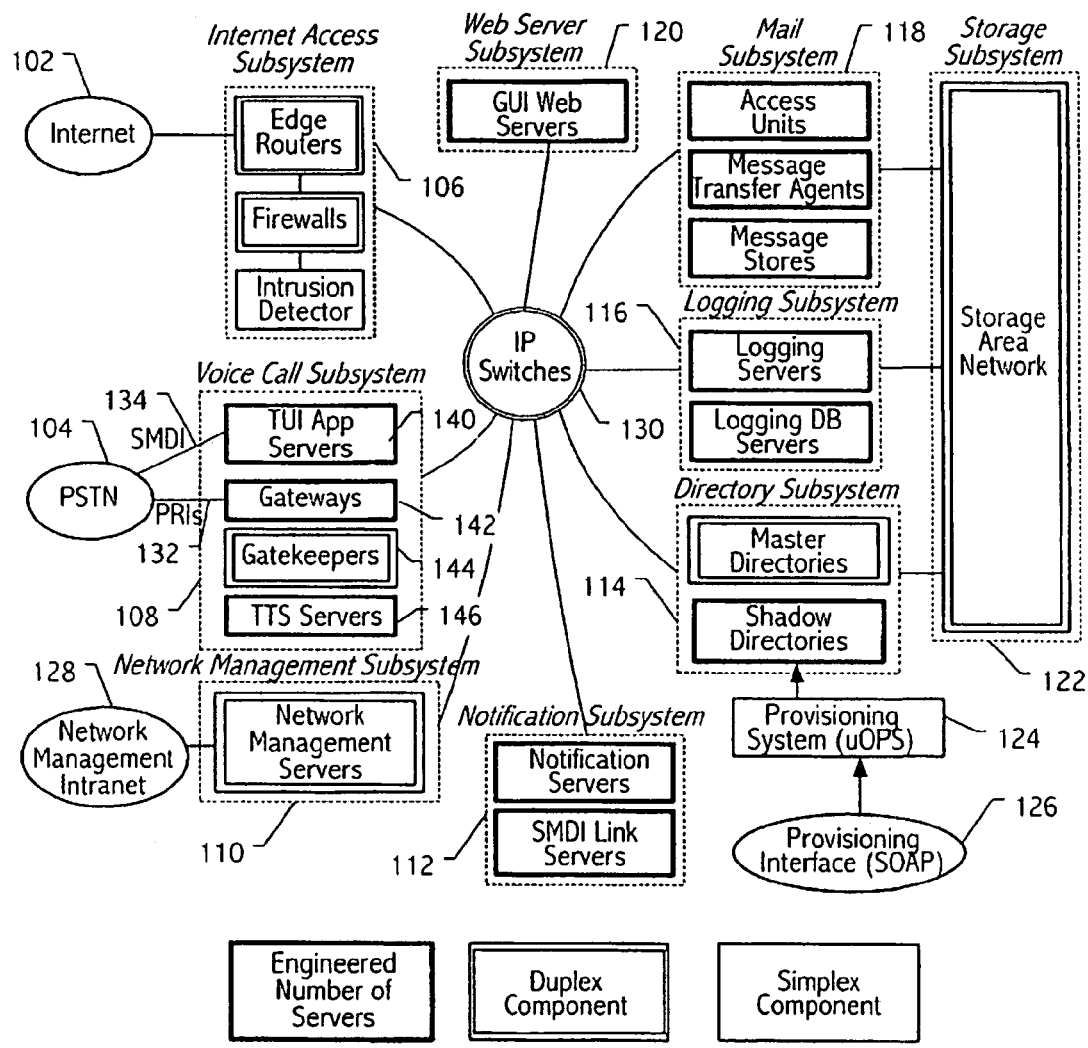
FIG. 1 is a block diagram that illustrates a data messaging system.

Referring to FIG. 1, a system 100 is illustrated. The system 100 is a messaging system that includes a plurality of subsystems. The messaging system 100 includes an internet access subsystem 106, a voice call subsystem 108, a network management subsystem 110, notification subsystem 112, directory subsystem 114, logging subsystem 116, mail subsystem 118, storage subsystem 122, and web server subsystem 120. The system 100 further includes a provisioning system 124 with provisioning interface 126. The system 100 also includes a network management intranet 128 coupled to the network management subsystem 110. The internet access subsystem 106 is coupled to the public internet 102, and the voice call subsystem 108 is coupled to the public switch telephone network (PSTN) 104 via a primary rate interface (PRI) 132, and simple message desk interface (SMDI) link 134. The internet access subsystem 106 includes an intrusion detector, firewalls, and edge routers. The voice call subsystem 108 includes telephone user interface application servers 140, gateways 142, gatekeepers 144, and text to speech servers 146. In a session initiation protocol (SIP) implementation, the gatekeeper is an SIP proxy agent and the gateway is an SIP user agent client.

The notification subsystem 112 includes SMDI link servers and notification servers. The directory subsystem 114 includes master directories and shadow directories. The logging subsystem 116 includes logging servers and logging database servers. The mail subsystem 118 includes access units, message transfer agents, and message stores. The directory subsystem 114, the logging subsystem 116, and the mail subsystem 118 are each coupled to the storage subsystem 122 that includes a storage area network. Web server subsystem 120 includes graphical user interface (GUI) web servers.

The messaging system 100 further includes an internet protocol switch network 130 coupled to each of the subsystems. The internet protocol switch network 130 may include a single switch or a distributed network of switches to handle traffic between the various subsystems. The system 100 is designed to handle a large volume of messaging traffic. For this reason, many of the subsystems include components that have more than one element. For example, to handle a large volume of traffic and to deal with system faults without losing messages or interrupting service, many of the components within the system 100 are duplex components, also referred to as redundant components.

The redundant components in FIG. 1 are illustrated with a double box indication. Examples where duplex components are used include the edge routers and firewalls within the internet access subsystem 106, the gatekeepers 144 within the voice call system 108, the network management servers within network management subsystem 110, master directories within the directory subsystem 114, and the storage area network in the storage subsystem 122.

In addition, many of the other components use an engineered number of servers to add scalability based on the particular configuration and traffic requirements. Such components within the various subsystems are indicated in FIG. 1 with a bold border around the component unit. With such components, the actual number of the components is determined based on appropriate engineering for the particular application and system to be deployed. By using engineered number of servers and fault tolerant configurations, a scalable and reliable overall messaging system that can handle large volume is provided.

The internet access subsystem 106 provides the messaging system 100 with connectivity to the internet 102. Email sent to subscribers and email sent by subscribers is transferred to the internet 102 across this interface. Subscriber access to the graphical user interface is also provided through this component group. The internet access subsystem 106 includes edge routers with external connectivity to the internet via an internet service provider, firewalls to control access to the internet protocol network 130, and an intrusion detector to recognize and throttle suspicious access attempts for security purposes. The internet access subsystem 106 also includes DNS servers for traffic routing within the system.

The voice call subsystem 108 provides a telephone interface to callers that leave voice messages for messaging system subscribers. The voice call subsystem 108 also provides subscribers with access to their mailbox from a voice telephone. The voice call subsystem 108 further provides an interface point for incoming and outgoing fax transmissions. This subsystem 108 includes gateways 142 that serve as an interworking point between time division multiplex-based PSTN and the voiceover IP network traffic used within the rest of the system 100. The gatekeepers 144 route incoming and outgoing calls between gateways and gateservers. The text to speech servers 146 execute software to provide text to speech conversion. This functionality may be used to play emails over a telephone user interface supported by servers 140.

The mail subsystem 118 provides an interface to subscriber mailboxes that contain email, voicemail, and fax messages. This subsystem 118 implements a web interface to the subscriber mailboxes and provides protocol access to the mailboxes for selected external access (e.g., incoming and outgoing mail via simple mail transfer protocol (SMTP)), and provides internal access (e.g., gateserver read and write access via IMAP4). In addition to machines that support mail access, this subsystem 118 also includes directory servers which contain both permanent and temporary data regarding a subscriber and the status of the current mail service. The functions provided by this subsystem are preferably software-based and the machines supporting such software may be general purpose computer servers. The mail subsystem 118 includes message transfer agents which are responsible for processing incoming and outgoing mail transfers using the SMTP protocol, post office protocol (POP) servers which provide access to stored message via the POP3 protocol, internet message access protocol (IMAP) servers which provide access to stored messages and headers via the internet message access protocol 4 (IMAP4), message store servers which host the storage subsystem on which the mail is stored, web servers to implement the web-based GUI to the mailbox and subscriber self-provisioning features, and directory servers that contain mail system configuration data, subscriber permanent data, and temporary data reflecting a current state of a subscriber's mailbox and service parameters. These software components are distributed across several physical platforms that may be designated as access units, message transfer agents, message storage, web servers, or 105 master directory servers.

The storage subsystem 122, including the storage area network, provides for duplicated high-availability storage for mail message, web pages, and configuration files for machines in the mail server subsystem 118, and optionally for the gateserver within the voice call subsystem 108. In a particular embodiment, the storage subsystem 122 includes host adaptor cards that implement layer 1 and layer 2 of fiber channel access mechanisms to the storage area network. The storage subsystem 122 further includes fiber channel switches to provide reliable and high performance access to various disk storage arrays from fiber channel configured hosts. The storage subsystem 122 further includes the disk arrays to provide redundant and high-speed storage, preferably using redundant arrays of independent disks (RAID) technology.

The network management subsystem 110 provides machines that run network management software. In this component group, pairs of clustered servers provide a reliable execution environment for network management software. The network management subsystem 110 includes computer servers, such as those manufactured by Sun Microsystems or Hewlett Packard (HP), or other servers loaded with the Microsoft NT operating system. The HP servers may include back-end interfaces to network management terminals providing for remote monitoring functionality. The internet protocol switch 130 is coupled to each of the other subsystems and may be implemented using a layer 3+ switch manufactured by Cisco. In a particular embodiment, a duplex switch configuration is utilized to provide for fault tolerance and redundancy. The switch may be implemented using virtual local area networks (VLANS) with virtual IP segments. With this capability, groups of components can be segregated within their own segment, and therefore, within a customized broadcast domain. The switch may act as a router for traffic to pass data from one VLAN to another. The multiple switches 130 also use load balancing between servers. A method to perform such load balancing is conventional round robin distribution based on layer 4 properties of the data traffic.

Figure 2:
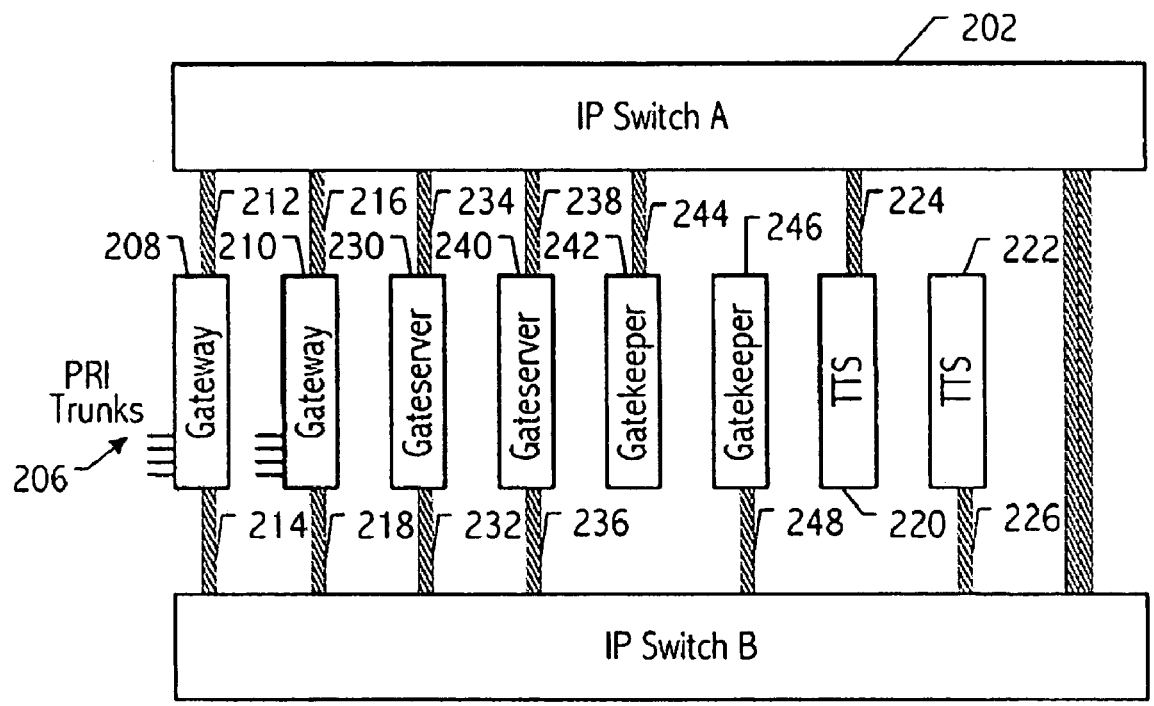
FIG. 2 is a block diagram that further illustrates a portion of the system of FIG. 1.

Referring to FIG. 2, the illustrative components within the voice call subsystem 108 are illustrated. Such components include gateways 208, 210, gateservers 230, 240, gatekeepers 242, 246, and text to speech servers 220 and 222. The various components are coupled to a first IP switch 202 and a second IP switch 204. For the gateways 208 and 210, such coupling is handled via two distinct VLAN networks. For example, gateway 208 is coupled to IF switch 202 via a first VLAN network connection 212 and is coupled to the second IF switch 204 via a second VLAN connection 214. The gateways 208 and 210 are also coupled to PRI trunks 206 for connection to the PSTN 104 and are used to provide time division multiplex to voice-over IF conversion functionality. The gateways 208 and 210 are configured with three different IP addresses, one for each of the two VLAN interfaces and a third loop-back address. The gatekeepers 242, 246 are used to implement the standard H.323 call control protocol and provide enforcement of call admission policy and call routing functionality. The gatekeepers and gateservers have a virtual address, such as Cisco's hot standby router protocol (HSRR) and an IF multi-path address as provided by the Sun Solaris operating system. With this configuration, packets destined for a particular device are addressed using its loop-back or virtual address. As a result of open shortest path first (OSPF) routing, the IF switch may send the packet on to the addressed device using a round-robin algorithm across the two VLANs for the gateway.

If a gateway interface should fail, the device can be reached via the alternative VLAN. OSPF will route to the loop-back address of the device using the available VLAN. If the device fails, the active gatekeeper can recognize this failure and route calls to the other available gateways using the same virtual address. Gatekeepers are deployed in active/standby pairs and one gatekeeper is connected to one switch and a second gatekeeper is connected to another switch. The text to speech (TTS) servers 222, 224 are a set of pooled resources that are available to the gateservers to provide the text to speech functionality. Each gateserver may execute round-robin load balancing over the set of available TTS servers. A single TTS server can be configured to provide service in multiple languages. This simplifies the engineering of such resources.

Gateways are engineered on the basis of trunks required to handle the offered call load and the calls-per-hour capacity of the gateway. Gatekeepers are engineered on the basis of their calls-per-hour capacity, and gateservers are engineered on the basis of the number of simultaneous VoIP streams they can process. Generally, even a network serving a small number of subscribers may require tens of gateways and gateservers. In an illustrative case, it may be reasonable to engineer to the required quantity to handle the busy hour load at a 0.001 grade of service, and in case of a failure, accept a small degradation in the grade of service until the failed unit is repaired or replaced. Alternatively, the gateways and gateservers could be engineered on an n+1 sparing basis, so that the busy hour offered load can continue to be carried at a 0.001 grade of service in the face of a single failure.

The gatekeeper can route to avoid a failed gateserver. Trunks to a failed gateway are designated as busy by the PSTN switch and calls are then routed to available trunks on active gateways.

A gatekeeper can handle a relatively large number of calls per hour, and so engineering may well indicate that only a single gatekeeper is required to handle the offered load. In this case, two gatekeepers should be deployed for reliability and operated in an active/standby configuration.

If the number of subscribers served by a site increases to the point where a single gatekeeper no longer has the call processing capacity to handle the full load, another active/standby gatekeeper pair will be deployed. A useful design is to partition the gateways and gateservers so that some are served by one pair of gatekeepers and the others are served by the other pair of gatekeepers. However, it is likely that by the time a site grows to a size requiring a second gatekeeper pair, new features may be developed that would allow an improved design based on designation of alternate gatekeepers. This would avoid the partitioning of gateways and gateservers into zones served by gatekeeper pairs.

TTS servers are capable of handling a limited number of simultaneous sessions. Because TTS servers are pooled, engineering can be done on the basis of total expected simultaneous sessions. Furthermore, because each server can provide multiple language support, the engineering process can take into account the expected total number of simultaneous sessions, independent of language.

Gateservers are configured to record event information in logs as callers and subscribers interact with the interactive user application. Each gateserver running the TUI application sends its logs to a centralized logging server to write the log to disk. A logging server can write logs for a limited number of gateservers, so even a moderate size installation will have multiple logging servers, and hence multiple log files. Each gateserver is configured to send its logs to one of the logging servers. The logging servers are attached to the storage area network, so the log files will be stored on a high reliability storage medium.

Logging servers are not replicated. If a logging server fails, the gateservers that log to it will write their log data to their local disk. When the affected logging server is restored, the gateservers may transfer their logs to the recovered logging server. In a particular embodiment, the gateservers are configured so they can store at least three days of log records locally.

In order to improve the correlations and searchability of the log file information, this data is subsequently written to a relational database. To perform this function, there are relational database management system (RDBMS) servers which periodically read from log files and write the log data to a database. As was the case for logging servers, RDBMS servers process a limited number of log files. However, one RDBMS server is sufficient to handle a moderate size installation, so an initial installation may be deployed with one RDBMS server. As the size of the installation grows beyond the capacity of a single RDBMS server, more can be added.

The RDBMS server is attached to the storage area network, so the log database will be stored on a high-reliability storage medium. As was the case with logging servers, the RDBMS server is not replicated because the logging servers continue to write to their log files even when no RDBMS server is processing their log file. Their log file may grow larger than normal, but eventually, when the RDBMS server is restored, the log files will be processed and no data will be lost.

Figure 3:
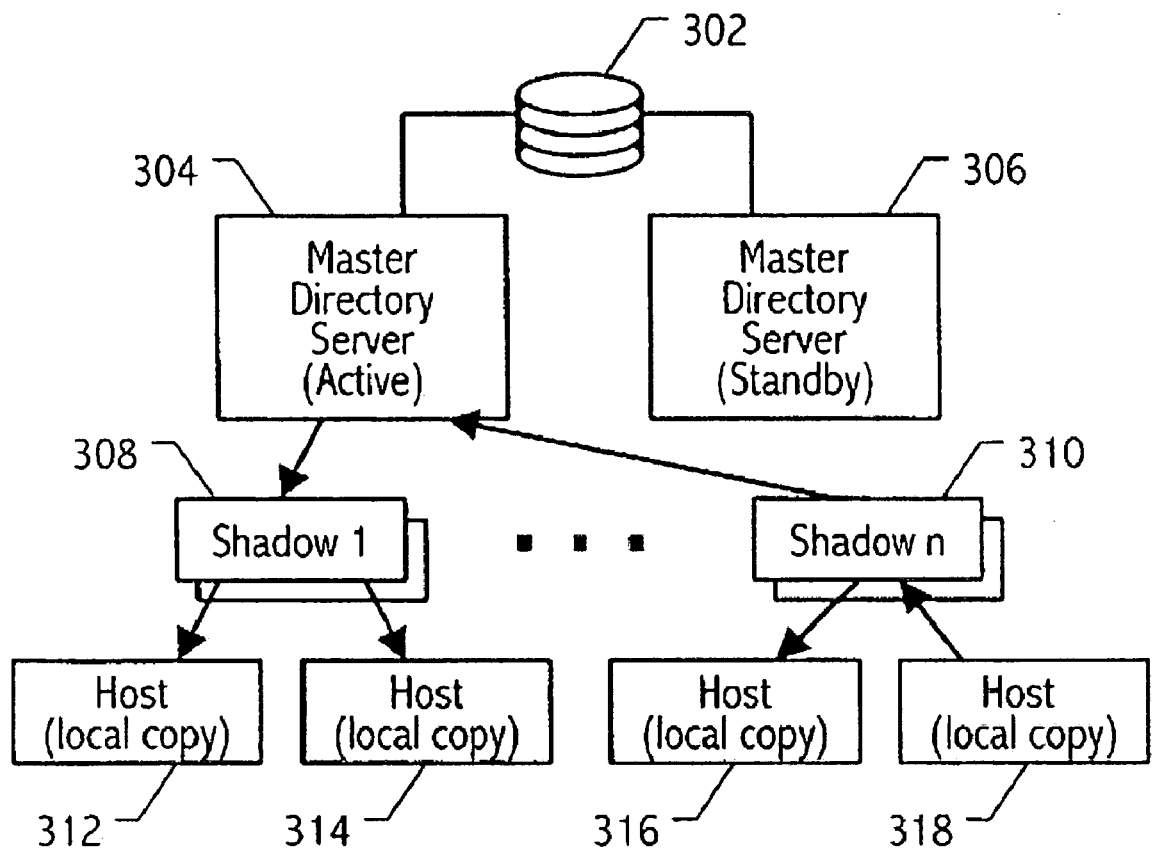
FIG. 3 is a general diagram that illustrates a directory structure used by the system of FIG. 1.

Referring to FIG. 3, further detail of the directory subsystem 114 is illustrated. This subsystem 114 includes master directory servers 304, 306, a database storage element 302, shadow directories 308 through 310, and a plurality of host elements 312, 314, 316, and 318. The directory servers are arranged in active/standby pairs and include shadow directories and local copies to provide for redundant storage and improved operational performance.

The data connection limited (DCL) directory architecture includes an active/standby pair of master directory servers (implemented using Veritas Cluster Server), n active/standby shadow directory server pairs (where n is determined by the number of hosts that require directory access), and local copies of the directory on selected hosts that require directory access.

Directory changes that originate in a host are first made to the local copy of the directory. The change is then propagated up to the host's shadow. The shadow directory propagates the change down to other hosts in its domain, and up to the master directory server. The master then propagates the change down to other shadow servers, which continue propagating down to their hosts. Provisioning changes originate at the master directory server and are propagated down through shadows to the hosts.

The purpose of the hierarchical design is to achieve scalability at the host level using a single active master directory. As the number of hosts grows, the number of shadows also grows so that directory updates can be propagated in a timely fashion. While FIG. 3 shows a single layer of paired shadow servers, it is possible to configure a hierarchy of shadows to further increase scalability.

Two master directory servers may be deployed and configured to run in an active/hot standby arrangement, as shown in FIG. 3. Veritas Foundation Suite software products (Veritas Cluster Server, Veritas Volume Manager, and Veritas File System) may be used to implement the high availability configuration between the two master directory servers.

Initially one of the master directory servers is actively running the directory application. It is configured with an IP address (called a virtual IP address) that domain name server (DNS) returns when queried for the directory application machine. The other master directory server is operational but not running the directory application. It is however communicating heartbeat messages with the active master directory server. This heartbeat will be carried over private network connections using a low latency protocol other than IP; this is to insure fast detection of a failed directory server partner.

When the active server fails, the standby server detects the failure via the lost heartbeat. Using configuration data, the standby server takes several steps to assume the role of the active server including assuming the virtual IP address (i.e., will now return the MAC address in response to an ARP for the virtual IP address), starting the directory application and other associated processes, and mounting the disk partitions and opening the files necessary to access the application data. When the failed machine is restored, the heartbeats resume and the newly restored machine assumes the role of the standby. When both machines are operational (with one active, one standby), it is possible to force a switch over by manual intervention.

For reliability, shadow servers may be deployed in active-standby pairs using Veritas Cluster Server. If a shadow server fails, it's standby will be switched to active and configured to take over the operating functions. When a failed shadow is restored, it should be restored as the standby in the pair, using virtual IP addresses as described above.

Figure 4:
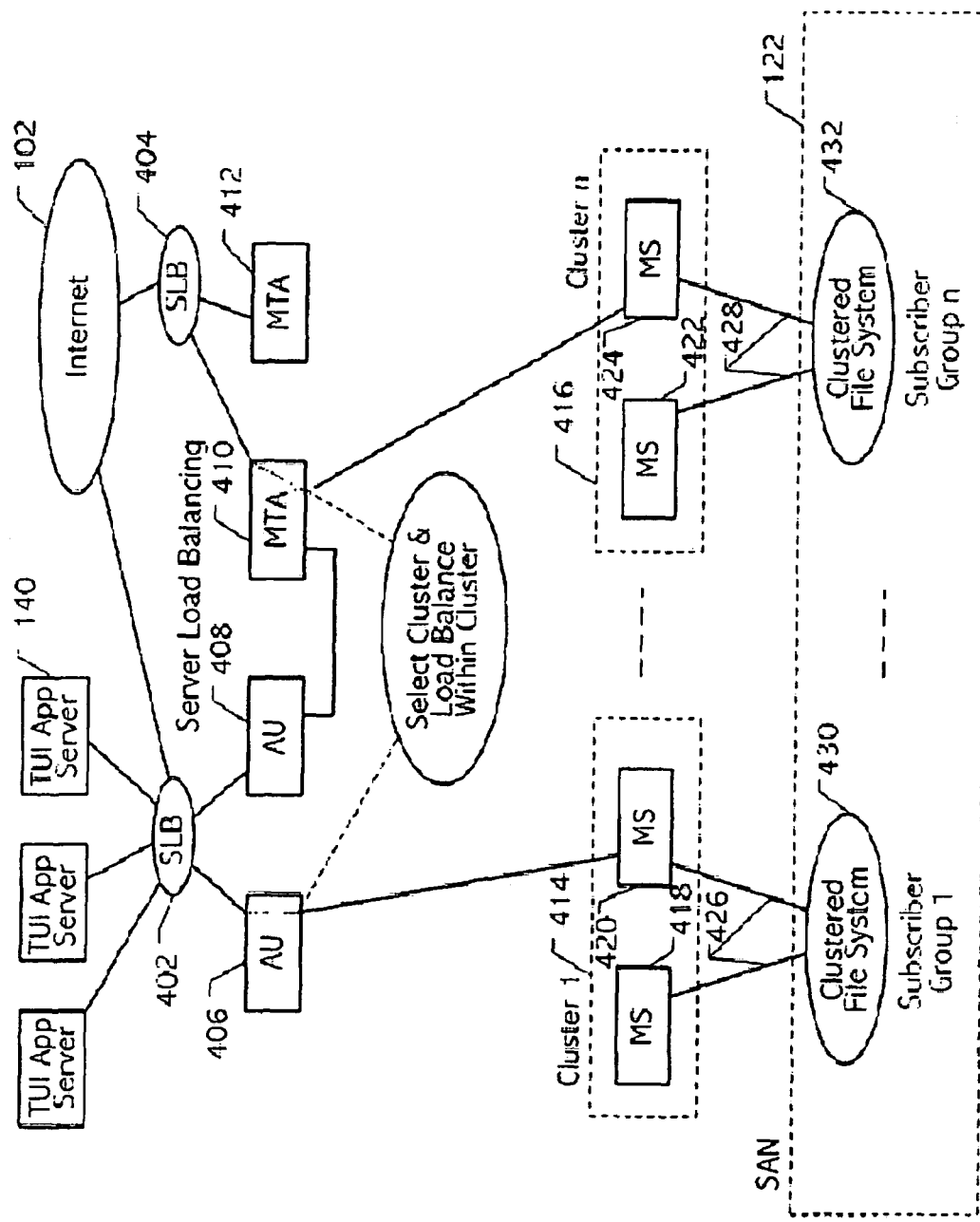
FIG. 4 is a block diagram that illustrates the storage subsystem within the system of FIG. 1.

Referring to FIG. 4, further details regarding a portion of the messaging system 100 is shown. The system includes a plurality of telephone user interface application servers 140, server load balancing units 402, 404, a plurality of access units 406, 408, and message transfer agents 410, 412. The system further includes message store clusters 414 and 416, and storage area network 122. The message store clusters include a plurality of message stores 418, 420, 422, and 424. The message store clusters are coupled to the storage area network via fiber channel links 426 and 428. The storage area network 122 includes many clustered file systems, such as groups 1-n (430 through 432).

Server clustering is used extensively to enhance the reliability of the subsystems within the mail and directory back end. The following paragraphs describe the clustering of the various subsystems.

All of the AUs in a site, such as AUs 406 and 408, reside in a single server cluster. AUs do not hold any subscriber specific data, so any request to an AU can be handled by any AU in the system. Clustering is implemented using server load balancing in the IP switches.

MTAs are clustered in a similar manner as AUs. MTAs in a site are located in a single server cluster that uses server load balancing. As in the AU case, MTAs do not hold subscriber-specific data, so each is interchangeable with the other from the point of view of providing MTA functionality.

Message Stores are clustered, but there is a limit to the size of a cluster. Because there is a limit on the size of a single MS cluster, each cluster provides access to a unique subset of all mailboxes on the system. Any MS in the cluster can access any mailbox served by the cluster. The mailbox for a particular subscriber is accessed through any of the messages stores in the subscriber's cluster. The bottom half of FIG. 4 shows several clusters of message stores, with each message store in a cluster having access to a group of subscriber mailboxes.

As an example of a message retrieval from the message store, the GS uses IMAP to request the message from the AU. The load balancing server, such as the Cisco Catalyst 6500, is used to select the AU. Any AU can be selected because each AU can access any subscriber's mailbox. The selected AU processes the IMAP request and then selects the MS cluster that serves the subscriber's mailbox, as determined via a directory lookup based on the subscriber ID. The AU then load balances (using a DCL algorithm) the retrieval request using a DCL protocol to an available MS in the subscriber's cluster.

A similar process occurs for depositing a message. In this case, SMTP is used rather than IMAP, and the deposit goes through an MTA as well as an AU. Just as with AUs, any MTA can be selected by the sending AU because any MTA can access any subscriber's mailbox. In this case, it is the MTA which does the cluster selection based on subscriber ID and routes the deposit to any MS in the subscriber's cluster.

A cluster of MSs serves each group of subscriber mailboxes. If an MS fails, this is detected by the AUs and MTAs, which will then route to other MSs in the same cluster. So a failed MS results in no loss of access to mailboxes or any other data. Only the processing power of the cluster as a whole is reduced.

With this architecture, even though MSs are dedicated to a group of subscriber mailboxes, ADs and MTAs are not. Both sets of these resources are pooled, and load balanced to provide fault tolerance and improved system performance.

If an AD fails, its connections to clients are lost. This loss would be visible to clients. They would eventually re-establish lost connections, to one of the surviving ADs (with the AD chosen by the server load balancing algorithm). If an MTA fails, this would not be visible to clients. ADs would resend any non-acknowledged message writes. The surviving MTAs would take over the load of message writes from ADs. When an AD detects the failure of an MTA, that MTA is removed from the AU's round-robin schedule.

The ADs, MTAs and the MSs write heartbeat files to a shared NFS directory. These elements detect failure by determining if a write fails, and if so, the machine that was supposed to have made the write is assumed to have failed, and therefore removed from the round-robin schedule.

The directory architecture is designed with an active and standby master directory server using a cluster server with the actual data residing on the high reliability SAN storage. In order to improve data access performance, the other servers (ADs, MTAs, and MSs) each run a slave directory server with the full master directory data. The distributed directory software keeps the slaves and master synchronized.

In a particular embodiment, within each pool (there are multiple MS pools or clusters, although the diagram only shows one), half of the servers are physically connected to one IP switch, the other half are connected to the other IP switch.

The machines hosting the active/standby NFS watchdog server function are dual attached, with one connection to each IP switch. Because of the importance of the NFS watchdog server function, it is also important that the machines hosting this function do not become inaccessible. Therefore they are attached to each IP switch.

Figure 5:
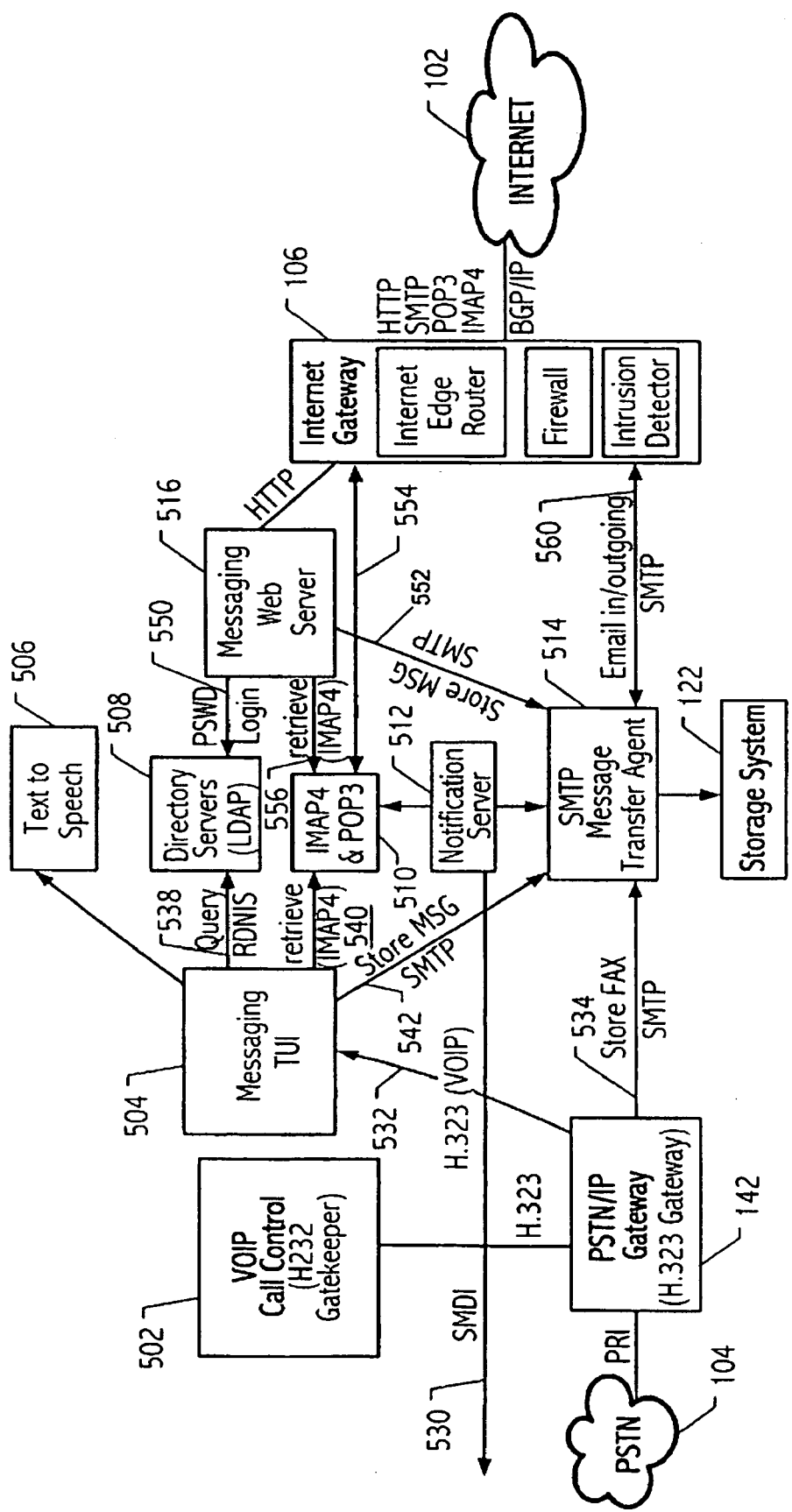
FIG. 5 is a functional diagram that illustrates operation of the system of FIG. 1.

Referring to FIG. 5, a functional diagram to illustrate operation message flow within the messaging system 100 is shown. The functional diagram illustrates a plurality of messaging components, including an H.323 gateway 142, a voice over IP (VoIP) call control unit 502, messaging TVI unit 504, SMTP email message transfer agent 514, notification server 512, text to speech unit 506, directory servers (LDAP) 508, IMAP4 and POP3 unit 510, and messaging web server 516.

During operation, voice traffic is received at the PSTN/IP gateway 142 from the PSTN 104 and is routed to VoIP call control unit 502 and then to the messaging TVI 504. The messaging TVI accesses directory server 508 and receives password and login information from the messaging web server 516. The messaging TVI may access the text to speech unit 506 and may route stored messages or convert voice messages to email attachments sent over interface 542 to the SMTP message transfer agent 514. Such messages may then be stored in the storage system 122. Further, the SMTP message transfer agent 514 is coupled to the internet gateway 106 via email interface 560. The internet gateway 106 is coupled to the internet 102 and provides communication via a plurality of different protocols including hyper-text transfer protocol (HTTP), SMTP, POP3, IMAP4 and BGP/IP.

The incoming internet traffic may be routed to the messaging webserver 516 where messages may be converted into SMTP format and communicated to the MTA 514 via the SMTP messaging interface 552. Such messages may be stored in the storage subsystem 122. In addition to providing storage of received messages via either the voice interface connected to the PSTN 104 or the web interface connected to the internet 102, the messaging system 100 also provides for retrieval, manipulation, routing, and other functionality with respect to such messages via both voice and internet interfaces. In addition to voice and data traffic, the system may also handle incoming fax transmissions. In this scenario, a fax is received at the gateway 142. The fax transmission at the gateway 142 is then converted into an email attachment, and the email is forwarded over the SMTP interface 534, to the message transfer agent 513, and then stored within the storage system 122. In addition to receiving voice, email, data, and fax communications, the system may be used to retrieve such messages on a subscriber basis using either a voice telephony interface or an internet browser interface.

Figure 6:
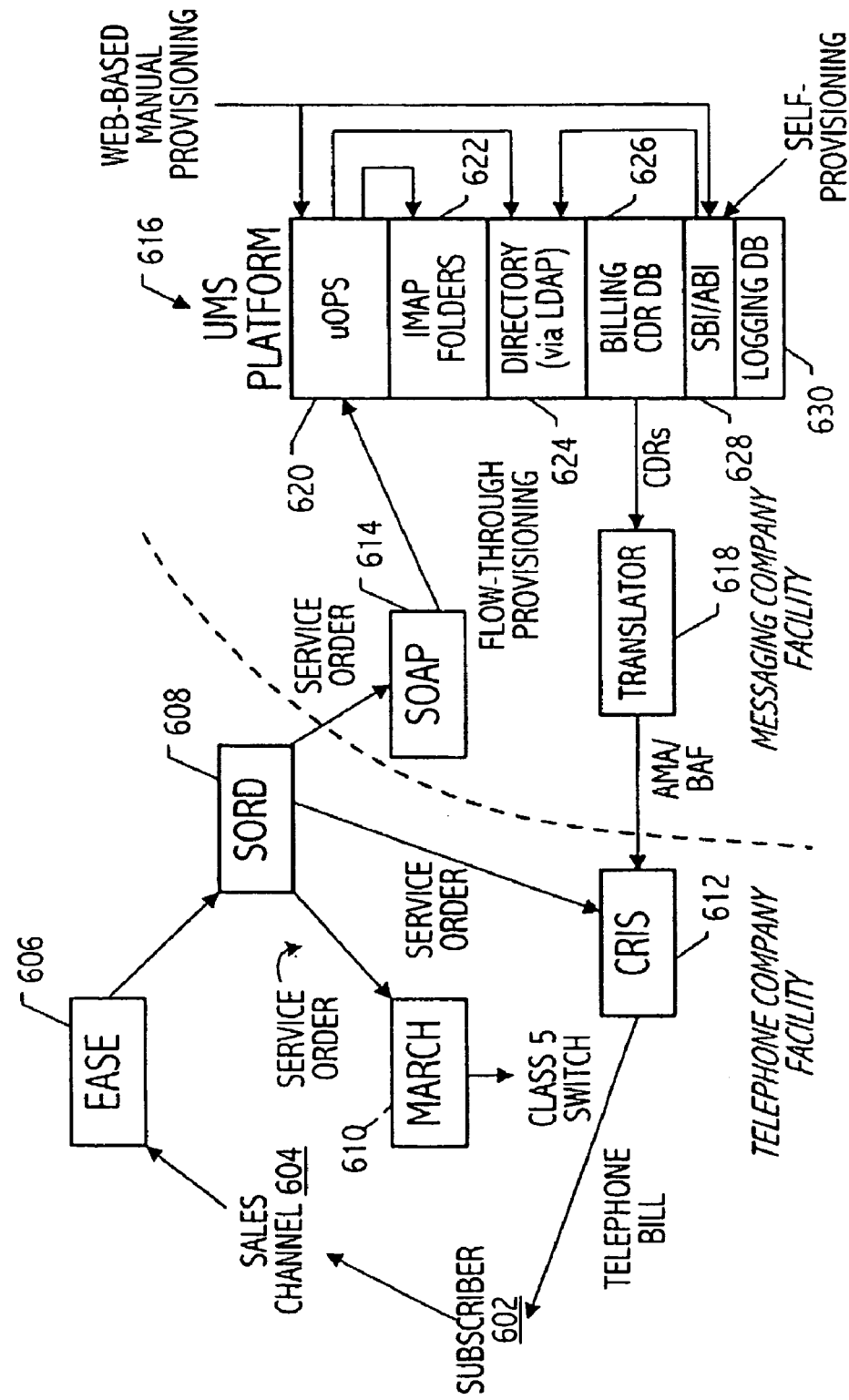
FIG. 6 is a general flow diagram that illustrates provisioning messaging for subscriber use.

Referring to FIG. 6, a method of initial provisioning of the messaging system service is illustrated. A subscriber 602 makes a request through sales channel 604 to the EASE element 606, which in turn passes the request to the service order request department (SORD) 608. The SORD 608 places a service order with the switch element 610 and with the CRIS element 612. Both the switch element 610 and the CRIS element 612 are within the telephone company facility. The SORD 608 also places a service order through the SOAP element 614 where flow-through provisioning occurs in connection with the messaging system platform 616. The messaging system platform 616 includes several elements such as micro-operations 620, IMAP folders 622, directory (LDAP) 624, billing and call data record database 626, SBI/ABI 628 and logging database 630. After use of the messaging service by the subscriber, appropriate billing records to track such service use are prepared at the billing CDR 626 and the call data records for such billed activities are translated by translator 618 and converted to AMA/BAF files, which are input to the CRIS 612. It should be noted that the SOAP element 614, the translator 618 and the messaging system 616 are, in this particular embodiment, operated within a separate messaging subsidiary facility. Upon receiving the AMA/BAF at the CRIS 612, a telephone bill is then communicated to the subscriber 602. The telephone bill will include billing entries for use of the messaging subsidiary messaging subscriber service.

During the process of taking an order for a new subscriber to the unified messaging system service, a method of assigning an initial automatic temporary subscriber identification, followed by a negotiated assignment of the permanent subscriber identification is provided. With this method, a unique temporary identity is first assigned to a subscriber of the unified messaging service. This identity may be assigned by a call center operator that receives an initial call from the subscriber. In a particular embodiment, the unique temporary identity is the subscriber's local telephone number. However, while the local telephone number can be used temporarily to identify the subscriber, due to privacy concerns, the local phone number is not used as the subscriber's permanent identity since the identity appears in the subscriber's email address. It would not be desirable to use a telephone number for the subscriber email address.

So, upon the subscriber's first access to the unified messaging service, where the subscriber uses the temporary identity to gain such access, such as via an internet connection where the subscriber's phone number is known or entered manually, and before messaging service is provided to the subscriber, the subscriber selects and then receives a second identity. The second identity is negotiated between the subscriber and a computer that checks the selected identity with permitted rules. For example, if the subscriber is named John Smith and selects the subscriber identity of JSmith, the computer may reject this identity since JSmith may have already been selected by another subscriber and the subscriber identity is to be unique among the set of unified messaging service subscribers. After the initial rejection of JSmith, in this particular example the subscriber selects JSmith25. This identity is unique and is accepted by the computer interface. The second identity of JSmith25 (i.e., the permanent identity) is assigned to subscriber John Smith. Another rule for the allowable identity is that the identity is not to include the subscriber telephone number due to privacy concerns. Once the second and permanent identity is assigned, the subscriber may thereafter access the service using the second identity and a selected password. The subscriber's email address for the unified messaging service also includes the second identity (e.g., JSmith25@pobox.com).

The above disclosed subject matter is to be considered illustrative and the appended claims are intended to cover all such modifications and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A data messaging system comprising:
   a first Internet Protocol switch that includes a processor;
   a first gateserver coupled to the first Internet Protocol switch, the first gateserver further coupled to a second Internet Protocol switch;
   a second gateserver coupled to the first Internet Protocol switch and coupled to the second Internet Protocol switch;
   a first gatekeeper coupled to the first Internet Protocol switch;
   a first voice gateway coupled to the first Internet Protocol switch and coupled to the second Internet Protocol Switch; and
   a second voice gateway coupled to the first Internet Protocol switch and coupled to the second Internet Protocol switch;
   wherein the first gatekeeper is adapted to detect a failure of the first gateserver and to route data to the second gateserver in response to detecting the failure, and
   wherein the first voice gateway is coupled to the first Internet protocol switch via a first virtual local area network and the first voice gateway is coupled to the second Internet Protocol switch via a second virtual local area network.

2. The system of claim 1,
   wherein a loop-back address is associated with the first voice gateway and the second voice gateway.

3. The system of claim 2, wherein when a data connection from one of the first Internet Protocol switch and the second Internet Protocol switch to the first voice gateway is not available, the loop-back address is used to route data to the second voice gateway.

4. The system of claim 1, wherein when the first voice gateway fails, voice calls are routed to the second voice gateway via hunt group capabilities of a class five switch.

5. The system of claim 1, wherein the first gateway and the second gateway are each responsive to voice communications over a voice traffic interface.

6. The system of claim 5, wherein the voice traffic interface is a primary rate interface.

7. The system of claim 1, wherein the second voice gateway is coupled to the first Internet Protocol switch via the second virtual local area network and the first voice gateway is coupled to the second Internet Protocol switch via the first virtual local area network.

8. The system of claim 1, wherein when a data connection from one of the first Internet Protocol switch and the second Internet Protocol switch to the first gateserver is not available, a virtual address is used to route data to the second gateserver.

9. The system of claim 1, further comprising a first text-to-speech server coupled to the first Internet Protocol switch.

10. The system of claim 1, further comprising a second text-to-speech server coupled to the second Internet Protocol switch.

11. The system of claim 1, wherein the first gatekeeper provides enforcement of call admission policy and call routing.

12. The system of claim 1, wherein the first gatekeeper is active and the second gatekeeper is in a standby mode.

13. The data messaging system of claim 1, further comprising a second gatekeeper coupled to the second Internet Protocol switch.

14. A non-transitory computer-readable medium storing processor-executable instructions that, when executed by a processor, cause the processor to:
    detect a failure of a first gateserver coupled to a first Internet Protocol switch, wherein the first gateserver is also coupled to a second Internet Protocol switch;
    route data to a second gateserver in response to detecting the failure; and
    re-route voice data that is unable to be routed to a first voice gateway to a second voice gateway, wherein the first voice gateway is coupled to the first Internet Protocol switch and coupled to the second Internet Protocol switch, wherein the second voice gateway is coupled to the first Internet Protocol switch and coupled to the second Internet Protocol switch,
    wherein the second gateserver is coupled to the first Internet Protocol switch and the second gateserver is also coupled to the second Internet Protocol switch, and wherein the first voice gateway is coupled to the first Internet Protocol switch via a first virtual local area network and the first voice gateway is coupled to the second Internet Protocol switch via a second virtual local area network.

15. The non-transitory computer-readable medium of claim 14, wherein the re-routing is performed using a loop-back address that is associated with the first voice gateway and with the second voice gateway.

16. The non-transitory computer-readable medium of claim 14, further comprising instructions to route the data to the second gateserver via a virtual address when a data connection from one of the first Internet Protocol switch and the second Internet Protocol switch to the first gateserver is not available.

17. A method of routing data, the method comprising:
    detecting, by a first gatekeeper, a failure of a first gateserver coupled to a first Internet Protocol switch, wherein the first gateserver is also coupled to a second Internet Protocol switch;
    routing data to a second gateserver in response to detecting the failure; and
    re-routing voice data that is unable to be routed to a first voice gateway to a second voice gateway, wherein the first voice gateway is coupled to the first Internet Protocol switch and coupled to the second Internet Protocol switch, wherein the second voice gateway is coupled to the first Internet Protocol switch and coupled to the second Internet Protocol switch,
    wherein the second gateserver is coupled to the first Internet Protocol switch and the second gateserver is also coupled to the second Internet Protocol switch, and wherein the first voice atewa is coupled to the first Internet Protocol switch via a first virtual local area network and the first voice gateway is coupled to the second Internet Protocol switch via a second virtual local area network.

18. The method of claim 17, wherein the re-routing is performed using a loop-back address that is associated with the first voice gateway and with the second voice gateway.

19. The method of claim 17, further comprising routing data to the second gateserver via a virtual address when a data connection from one of the first Internet Protocol switch and the second Internet Protocol switch to the first gateserver is not available.

* * * * *